United States Patent Office 2,824,138
Patented Feb. 18, 1958

2,824,138
PINONYL ALCOHOL

Vernon P. Wystrach, Noroton Heights, and Richard K. Madison, Stamford, Conn., assignors to American Cyanamid Company, New York, N. Y., a corporation of Maine No Drawing. Application December 21, 1956
Serial No. 629,775

3 Claims. (Cl. 260—586)

This invention relates to pinonyl alcohol, which is 2,2-dimethyl-3-acetylcyclobutane-ethanol, having the structural formula

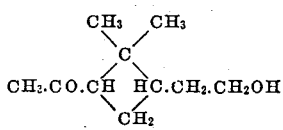

The invention includes the new compound itself, its method of preparation from pinane hydroperoxide, and nonionic surface active agents obtained by condensing it with ethylene oxide or propylene oxide.

The peroxides obtained from bicyclic terpenes such as alpha-pinene, beta-pinene, gum turpentine and the like are described in U. S. Patent No. 2,735,870, dated February 21, 1956. These and similar bicyclic unsaturated terpenes are converted into the corresponding saturated cyclic terpenes by hydrogenation and the saturated compounds are oxidized with air or oxygen in the liquid phase. We have found that upon treatment of the resulting pinane hydroperoxides with acylating agents such as organic acid chlorides and anhydrides the corresponding hydroperoxide esters are not obtained; instead, the ester undergoes rearrangement with migration of oxygen into the ring.

Thus, for example, the reaction of pinane hydroperoxide with benzoyl chloride would be expected to form the ester

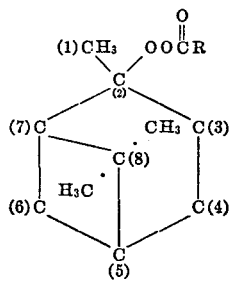

We have found, however, that the treatment of this hydroperoxide with an acylating agent gives a different product which upon hydrolysis forms 2,2'-dimethyl-3-acetylcyclobutane-ethanol. The intermediate esterification product therefore consists primarily of the compound

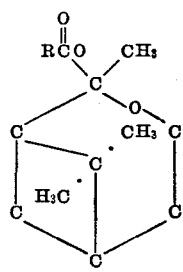

The rearrangement resulting in the formation of this compound is explained by the fact that due to the strained ring system, migration of oxygen takes place at the C-3 carbon atom.

The intermediate produced by esterification is easily hydrolyzed to 2,2-dimethyl-3-acetylcyclobutane-ethanol, which can properly be called pinonyl alcohol, by refluxing with a water-soluble alcohol in admixture with water and then saponifying with aqueous alkali. The pinonyl alcohol obtained by this procedure is a colorless water-insoluble oil having a boiling point of 113° C. at 1.2 mm. of mercury pressure.

The new product has the characteristics of a primary alcohol and can therefore be converted into esters by reaction with organic monocarboxylic and dicarboxylic acids such as acetic acid, phthalic acid and the like. We have found that, by reason of its dimethylcyclobutane radical containing an attached hydroxyl group, its condensation products with from 5 to about 20 mols of ethylene oxide or propylene oxide are effective nonionic surface active agents which may be used in textile treating processes as a replacement for the alkylphenol-polyethenoxy compounds now in wide commercial use.

The invention will be further described and illustrated by the following examples.

Example 1

Pinane hydroperoxide was prepared by hydrogenating alpha-pinene and oxidizing the resulting cis-pinane with oxygen gas as described in U. S. Patent No. 2,735,870. A product having a peroxide number of 11,100 was separated from the oxidation product by distillation.

A flask fitted with a thermometer, dropping funnel and stirrer was charged with 90 ml. pyridine and 64 grams of the pinane hydroperoxide and 54 ml. of benzoyl chloride was added slowly while maintaining the reaction temperature at 0° C. The mixture was stirred for two hours at 0° C. and then warmed to room temperature, diluted with 350 ml. of ether and extracted successively with water six times (300 ml. total), 4% HCl three times (150 ml. total), water three times (150 ml. total), dilute sodium bicarbonate three times (150 ml. total) and again three times with water. The ether solution was dried over anhydrous sodium sulfate and the ether was removed, leaving 105 grams of a product having an acid number of 5.0, $n_D^{25}$ 1.5315, peroxide number 887 and saponification equivalent 232.

A 50 gram quantity of this product was refluxed with a mixture of 80 ml. of methanol and 5 ml. of water for six hours and allowed to stand overnight. The methanol was then removed by distillation leaving 52 grams of a crude product which was mixed with 90 ml. of 11% aqueous potassium hydroxide, heated to reflux and cooled to room temperature. The alkaline solution was then extracted with ether and the ether layer was separated from the water layer. The aqueous layer on acidification yielded 21.56 grams of benzoic acid.

Upon evaporation of the ether from the ether layer there was obtained 32 grams of the crude rearrangement product. Fractionation of 24.67 grams of this material yielded 15.82 grams of a colorless oil, B. P. 109°–113° C. at 120 mm., $n_D^{25}$ 1.4686. Upon redistillation a purified 2,2-dimethyl-3-acetylcyclobutane-ethanol was obtained having the following physical constants: B. P. 113° C. at 120 mm.; $n_D^{25}$ 1.4709; $\alpha_D^{24}$ +22.68 (neat).

Analysis.—Calculated for $C_{10}H_{18}O_2$: C, 70.54; H, 10.66. Found: C, 70.11; H, 10.35.

Example 2

Another portion of the pinane hydroperoxide of Example 1 was reacted with acetic anhydride. To a reaction flask fitted with a stirrer, dropping funnel, thermometer and condenser was added 100 ml. acetic anhydride and 0.2 ml. concentrated sulfuric acid. The contents of the flask were cooled to 0° C. and 20 grams of the hydroperoxide (85% pinane hydroperoxide) was added dropwise over a period of one hour while keeping the temperature between 0° and +2° C. The reaction mixture was stirred an additional three hours at 0° C. and was then poured into ice water and extracted with ether. The ether extract was washed with water and sodium bicarbonate solution until neutral, dried, and the ether removed. The residue, weighing 26.7 grams had a saponification number of 206.9 and a peroxide number of 453. The corresponding theoretical values for cis-pinane hydroperoxide acetate are 212 and 9434, respectively, and it was therefore evident that the material was mainly the rearranged product.

A 30 gram sample of this material was refluxed with aqueous methanol and saponified with aqueous alkali as in Example 1. After purification by the procedure of that example the same 2,2-dimethyl-3-acetylcyclobutane-ethanol was obtained.

*Example 3*

A 17 gram portion of the pinonyl alcohol product of the preceding examples was placed in a small flask equipped with a reflux condenser and 3 ml. of 40% sodium hydroxide solution was added. The mixture was heated to 120°–130° C. and ethylene oxide was introduced with agitation during 8 hours and reacted until 36 grams was absorbed. Refluxing was continued for an additional hour after which the light colored product was cooled and recovered.

Additional samples were prepared containing 5, 12 and 20 mols of combined ethylene oxide, using the same procedure. All of the products were soluble in water to 1% solutions which foamed on shaking. When tested for wetting power by the Draves test 0.1% concentration and 30° C. the sinking times were as follows:

| Mols Combined Ethylene Oxide | Wetting Time, Seconds |
|---|---|
| 5 | 23 |
| 8 | 19 |
| 12 | 21 |
| 20 | 35 |

*Example 4*

Another sample of the pinonyl alcohol of Examples 1 and 2 weighing 5.92 grams was dissolved in 75 ml. of ether and slowly added with stirring to 1.30 grams of lithium aluminum hydroxide in 150 ml. of ether and the agitation was continued for an additional 10 minutes. Then 18 ml. of water was cautiously added. The resulting mixture was poured into 100 ml. of water to which was then added 100 ml. of 10% aqueous sulfuric acid, the ether layer was separated, and the aqueous layer was extracted with three 100 ml. portions of ether. The ether solution and extracts were combined and dried over sodium sulfate, the ether was removed and the residue, 5.73 grams, was fractionated. A main fraction, 4.20 g., B. P. 110°–115° C. at 0.3 mm., $n_D^{25}$ 1.4730, $\alpha_D^{25}$ 7.45° (7.2, methanol) was obtained and identified as 3-(1-hydroxyethyl)-2,2-dimethylcyclobutane-ethanol. Analysis showed it to contain 69.91% carbon, 11.81% hydrogen; theory for $C_{10}H_{20}O_2$: C, 69.76; H, 11.62.

What we claim is:

1. 2,2-dimethyl-3-acetycyclobutane-ethanol.

2. A method of preparing 2,2'-dimethyl-3-acetylcyclobutane-ethanol which comprises acylating a tertiary pinonyl hydroperoxide and hydrolyzing and saponifying the resulting ester.

3. The condensation product of one mol of 2,2-dimethyl-3-acetylcyclobutane-ethanol with from 5 to 20 mols of ethylene oxide.

No references cited.